United States Patent
Goiran et al.

[11] Patent Number: 6,158,947
[45] Date of Patent: Dec. 12, 2000

[54] DEVICE AND METHOD FOR LOADING AND UNLOADING CONTAINERS

[75] Inventors: Thierry Goiran, Bonson; Jean-Louis Claudinon, St-Just sur Loire, both of France

[73] Assignee: Marrel, Andrezieux-Boutheon, France

[21] Appl. No.: 09/243,679

[22] Filed: Feb. 3, 1999

[30] Foreign Application Priority Data

Feb. 9, 1998 [FR] France .................... 98 01478

[51] Int. Cl.⁷ .................. B60P 1/00; B60P 1/64
[52] U.S. Cl. ................... 414/500; 414/491; 414/494; 414/498; 414/546; 414/555; 414/812
[58] Field of Search .................. 414/498, 491, 414/494, 500, 546, 555, 538, 679, 812

[56] References Cited

U.S. PATENT DOCUMENTS

| | | | |
|---|---|---|---|
| 3,878,948 | 4/1975 | Corompt . | |
| 4,132,325 | 1/1979 | Corompt | 414/498 |
| 4,153,169 | 5/1979 | Cipkowski | 414/442 |
| 4,911,318 | 3/1990 | Bishop | 414/498 X |
| 5,213,466 | 5/1993 | Bubik | 414/494 |
| 5,290,138 | 3/1994 | Smart et al. | 414/491 |
| 5,437,531 | 8/1995 | Kress | 414/555 |
| 5,531,559 | 7/1996 | Kruzick | 414/498 |
| 5,542,808 | 8/1996 | Chiron et al. | 414/498 |
| 5,597,281 | 1/1997 | Croiset et al. | 414/498 |
| 5,601,393 | 2/1997 | Waldschmitt | 414/498 |

FOREIGN PATENT DOCUMENTS

| | | |
|---|---|---|
| 278782 | 8/1988 | European Pat. Off. . |
| 0 340 937 | 11/1989 | European Pat. Off. . |
| 0 344 948 | 12/1989 | European Pat. Off. . |
| 2 185 520 | 1/1974 | France . |
| 2594754 | 8/1987 | France . |
| 33 12 557 | 10/1984 | Germany ............... 414/546 |
| 9 000 143 | 8/1991 | Netherlands . |
| 1 430 107 | 3/1976 | United Kingdom . |
| 2 085 845 | 5/1982 | United Kingdom . |

*Primary Examiner*—Robert P. Olszewski
*Assistant Examiner*—Gerald J. O'Connor
*Attorney, Agent, or Firm*—Kenyon & Kenyon

[57] ABSTRACT

A device includes a handling structure which has an end portion and a remaining part. The device also includes a driving arrangement which drives the handling structure between (i) a position of transportation in which the remaining part is disposed along a chassis of the vehicle and in which the end portion is at the front, and (ii) a position of picking up a load or placing it on the ground where the end portion is at the rear of the remaining part and behind the vehicle with its free end at a certain height with respect to the ground, in order to cooperate with a load whose gripping means is lower. In addition, the device includes a connecting arrangement which connects the free end of the end portion to the gripping arrangement and a controlling arrangement which controls the distance between the gripping arrangement and the end of the end portion using which the later is attached to the remainder of the handling structure. The distance between the position of transportation and the position of picking up or placing on the ground is controlled. In the apparatus, the controlling arrangement is formed by a cable and a winching device.

21 Claims, 11 Drawing Sheets

DEVICE AND METHOD FOR LOADING AND UNLOADING CONTAINERS

FIELD OF THE INVENTION

The present invention relates to the picking up or placing on the ground by a vehicle of a load, such as a skip, having a gripping means at the front.

BACKGROUND INFORMATION

French Patent Application No. 2,185,520 describes a conventional apparatus which is designed to manipulate loads provided with a gripping handle on their front face.

SUMMARY OF THE INVENTION

An apparatus according to an exemplary embodiment of the present invention, includes:

a handling structure, having an end portion and a remaining part, the end portion extending between a free end adapted to have the load gripping handle suspended thereon and an end by which the end portion is attached at an angle to the remaining part;

means for tiltably mounting the handling structure on the chassis of the vehicle; and means for driving the handling structure between a position of transportation where the remaining part is disposed along the vehicle chassis and where the end portion is at the front of the remaining part with the free end above the attached end, and a position of picking up from or placing on the ground the load in which the end portion is at the rear of the remaining part and behind the vehicle with the attached end being above the free end which is at a predetermined height with respect to the ground corresponding to the height at which the load gripping handle is situated.

The present invention aims to increase the possibilities of use of this type of apparatus.

To this end it proposes a device such as the above apparatus, characterized in that it also has, for cooperating with the load when its gripping means is of a first type situated at a height lower than the predetermined height:

connecting means for connecting the free end of the end portion to the gripping means of the first type, adapted to pivot both about the free end and about this gripping means; and means for controlling the distance between the attached end of the end portion and the gripping means of the first type.

The means for controlling this distance make it possible, when picking up from the ground, to bring the front bottom part of the load close to the end portion so that, in the position of transportation, the load can be situated in the normal position where the end portion is just in front of it, the load being just above the remaining part of the handling structure, which is itself just above the vehicle chassis.

Without these means of controlling the aforementioned distance, it would have been very difficult, or even impossible, to bring the load into this normal position, gravity opposing the lifting of the load onto the vehicle.

The aforementioned distance controlling means are also useful for placing the load on the ground, in order to prevent the load, under the effect of gravity, from coming abruptly into contact with the ground.

It can be seen that the present invention considerably extends the possibilities of use of the above mentioned apparatus since, by virtue of it, loads can be handled which do not have a front face designed to withstand lifting forces.

It is in particular possible to handle skips of the type normally found in the United States, which are designed to be gripped at the front at ground level, ISO standard containers, which are gripped by the bottom front corner fittings, or a simple deck which is attached by one end.

The device according to the present invention preferably remains capable of operating in the usual manner, that is to say it has, for cooperating with the load when its gripping means, the to be of the second type, is situated at the predetermined height with respect to the ground, a hook adapted to engage with the gripping means of the second type, the hook forming the free end of the end portion.

According to preferred features, the connecting means are adapted to be fitted on a hook which forms the free end of the end portion.

The connecting means are thus totally removable, so that the same handling structure can be used with different connecting means designed, for example, to cooperate respectively with various kinds of loads with gripping means of the first type.

According to alternative preferred features, the connecting means are mounted so as to rotate on a journal disposed at the free end of the end portion. The connection means can thus be mounted permanently on the end portion, so that it is not necessary to provide a specific location on the vehicle to store the connecting means.

According to other preferred features, the connecting means have, at one end, hooks adapted to be attached to a pair of wheels situated at the bottom and in front of the load, the wheels thus serving as a gripping means of the first type.

The loads provided with such a pair of wheels are currently found, in particular in the United States.

These wheels are normally designed to enable the load to roll on a support, but they are also suitable as a gripping means, as the present invention proposes, since, on the one hand, their conformation makes it possible to easily design a hook so that the connecting means can hook onto the wheels by their end, and since, on the other hand, the design of the load is such that high forces are exerted at the wheels.

According to other preferred features, the connecting means have an interface provided with twist locks adapted to engage on the front bottom corner fittings of an ISO standard container.

By thus taking the container, stressing it during maneuvers of picking it up or placing it on the ground in a way that might damage it, is avoided. In particular, exerting excessively high traction forces on its front face is avoided.

Moreover, providing the twist locks on an interface makes it possible for his interface to have connecting means designed to cooperate with a pair of front bottom rollers, providing gripping members on the interface similar to the wheels.

According to other features which are preferred as being particularly simple, convenient and economical to implement, the means for controlling the distance between the attached end of the end portion and the gripping means of the first type, include:

a cable adapted to leave the handling structure at the level of the attached end of the end portion; and winching means mounted on the handling structure for extending or shortening, in a controlled manner, the quantity of the cable situated between the attached end of the end portion and the free end of the cable.

According to other preferred features, the cable has at its free end a loop adapted to cooperate with a central hook provided at the bottom and at the front of the load.

Thus the traction hook normally provided on loads which are currently found in the United States is used directly.

According to other preferred features, the connecting means have a hook onto which the cable is adapted to be attached.

In this way loads which do not have a traction hook can be handled, or the hook of the connecting means can be used rather than the one on the loads for practical reasons.

The present invention also relates, in a second aspect, to an apparatus suitable for forming part of the device as disclosed above, this apparatus having:

- a handling structure, having an end portion and a remaining part, the end portion extending between a free end adapted to have the gripping handle suspended thereon and an attached end by which the end portion is attached at an angle to the remaining part;
- means for tiltably mounting the handling structure on the chassis of the vehicle; and
- means for driving the handling structure between a position of transportation where the remaining part is disposed along the vehicle chassis and where the end portion is at the front of the remaining part with the free end above the attached end, and a position of picking up from or placing on the ground the load in which the end portion is at the rear of the remaining part and behind the vehicle with the attached end being above the free end which is at a predetermined height with respect to the ground;

and also having:
- a cable adapted to leave the handling structure at the attached end of the end portion, and
- winching means mounted on the handling structure for extending or shortening, in a controlled manner, the quantity of the cable situated between the attached According to preferred features, the winching means are disposed on the end portion, opposite to the remaining part, an aperture being provided in the end portion to enable the cable to pass.

By virtue of this arrangement, the winching means introduce no interference, and in particular enable the front of the load to come up against the end portion in the position of transportation.

According to other preferred features, the apparatus has means of controlling the winching means to enable them, during a maneuver of picking up a load from the ground, to take up the slack in the cable in the direction of shortening the quantity of cable situated between the attached end of the end portion and the free end of the cable and to prevent any reverse movement.

By virtue of these features, it is possible to effect the maneuver of picking up a load from the ground in a particularly easy manner.

According to other features preferred, notably for reasons of safety during maneuvers of placing a load on a ground, the apparatus has means of controlling the winching means to enable them, during a maneuver of placing a load on the ground, to control the speed at which the cable is paid out.

The present invention also relates in a third aspect, to a method for enabling a vehicle to pick up or place on the ground a load having a gripping means at the front, comprising the step of using an apparatus having:

- a handling structure, having an end portion and a remaining part, the end portion extending between a free end adapted to have the gripping means suspended thereon and an attached end by which the end portion is attached at an angle to the remaining part;
- means for tiltably mounting the handling structure on the chassis of the vehicle; and
- means for driving the handling structure between a position of transportation where the remaining part is disposed along the vehicle chassis and where the end portion is at the front of the remaining part with the free end above the attached end, and a position of picking up from or placing on the ground the load in which the end portion is at the rear of the remaining part and behind the vehicle with the attached end being above the free end which is at a predetermined height with respect to the ground;

comprising, for picking up or placing on the ground a the load whose gripping means is of a first type situated at a height below the predetermined height:
- the step of disposing connecting means between the free end of the end portion and the gripping means of the first type, so that the connecting means can pivot both about the free end and about this gripping means; and
- the step of controlling, between the position of transportation and the position of picking up or placing on the ground, the distance between the attached end of the end portion and the gripping means of the first type.

DETAILED DESCRIPTION

Figures 1, 2:
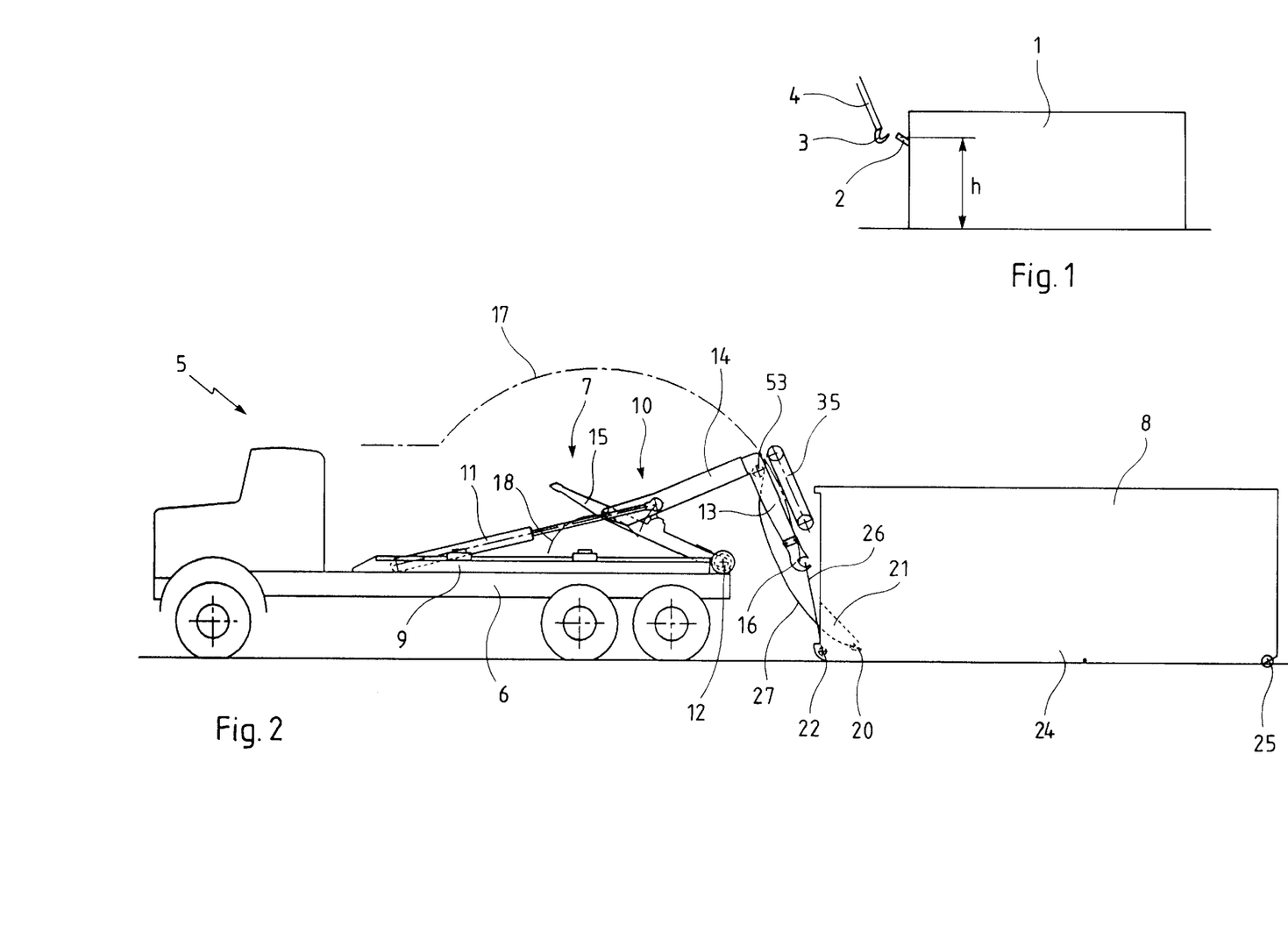
FIG. 1 shows a highly schematic elevation view, taken from the left-hand side, showing the end of a conventional handling apparatus with a hook lift, with which a truck is provided for picking up or placing on the ground a load such as the illustrated skip, which has on its front face a gripping handle situated at a relatively great height with respect to the ground.
FIG. 2 shows a view in elevation taken from the left-hand side of a truck provided with a similar apparatus but according to the present invention for lifting or placing on the ground a load which can be either of the same type as the skip shown in FIG. 1 or of the same type as the skip shown in FIG. 2, which has at the front, at ground level, two wheels situated respectively on the left and on the right, as well as a hook situated at the center.

The skip 1 shown in FIG. 1 is of the type which is normally found in Europe. It is provided, in a conventional manner, with two longitudinal rails (not depicted) situated respectively on the left and on the right on its bottom face and a gripping handle 2 situated on its front face at a distance h from the ground of around 1.40 m. The handle 2 enables the skip 1 to be suspended from a hook 3 situated at the free end of an end portion 4 of a handling apparatus with a tilting hook fitted to a vehicle for picking up or placing on the ground loads of the same type as the skip 1.

The truck 5 shown in FIG. 2 has a carrying chassis 6 on which there is mounted an apparatus 7 with a tilting hook, modified so as to be capable also of manipulating loads such as the skip 8 which is not provided with a handle 2 at the height h, but with elements capable of serving as gripping means situated at a lower height, here at ground level.

The apparatus 7 with which the truck 5 is equipped has a frame 9 mounted on the chassis 6, a handling structure 10 articulated at the rear on the frame 9, two identical titling jacks 11 disposed respectively on the left and right of the structure 10, each articulated at one end at the front of the frame 9 and at the other end on the structure 10, and two wheels 12 disposed respectively to the left and right at the rear of the frame 9.

The handling structure 10 has a bracket, one of the legs of which forms the end portion 13 of the structure 10 and the other leg of which forms a telescopic arm 14 to which the portion 13 is attached at an angle. The structure 10 also includes a rocker 15 on which the end of the telescopic arm opposite to the end portion 13 is articulated, the rocker 15 being articulated at the rear on the frame 9.

In the position of picking up or placing on the ground (FIG. 2), the end portion 13 is at the rear of the structure 10 and behind the truck 5 with its free end below the arm 14 and at the height h with respect to the ground.

Figure 5:
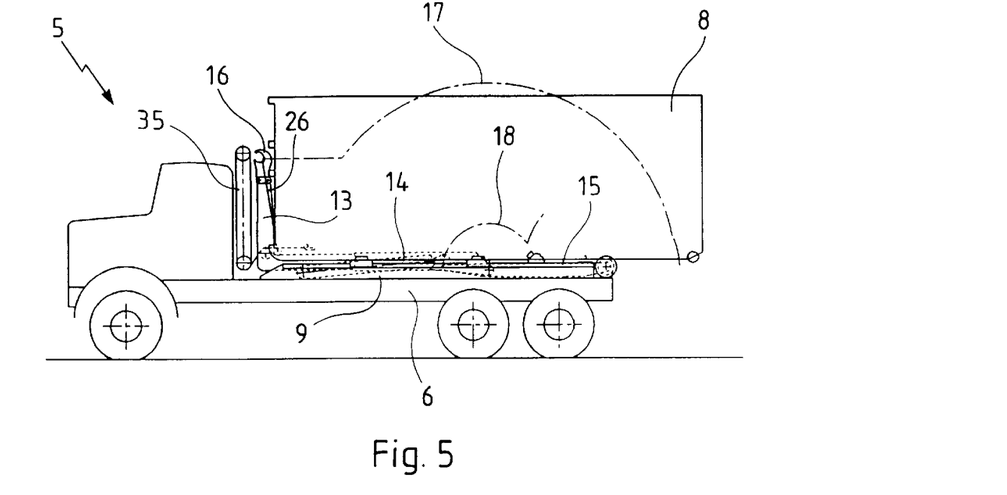
FIG. 5 shows a view similar to FIG. 2, but in the position of transportation rather than in the position of picking up or placing on the ground.
Figure 6:
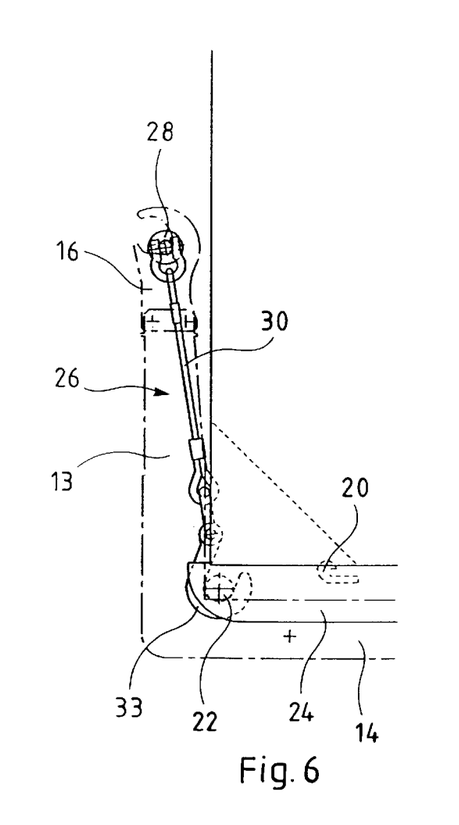
FIG. 6 shows a view similar to FIG. 3, but in the position of transportation rather than in the position of picking up or placing on the ground.
Figure 7:
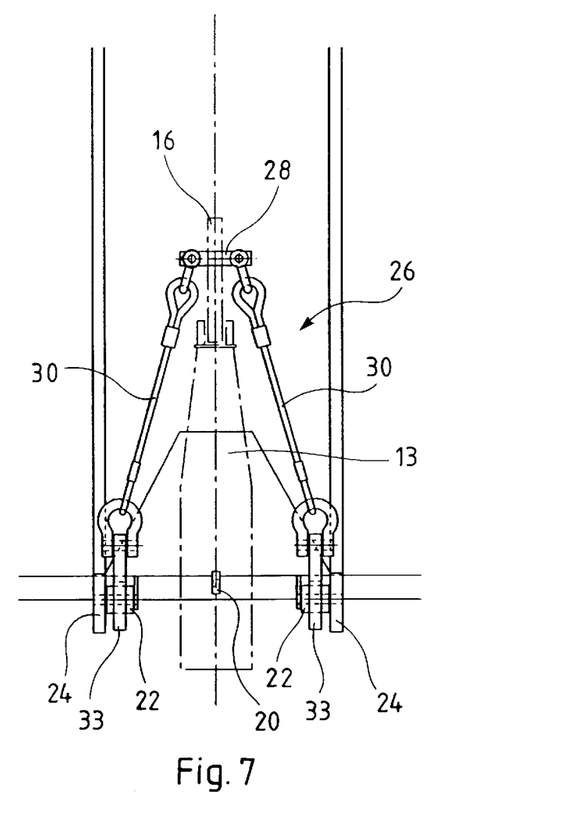
FIG. 7 shows a view similar to FIG. 4, but in the position of transportation rather than in the position of picking up or placing on the ground.

In the position of transportation shown in FIG. 5, the rocker 15 and arm 14 are disposed on the frame 9 along the chassis 6 while the end portion 13 is at the front of the arm 14 with its free end above this arm.

When the apparatus 7 passes from the position of picking up or placing on the ground (FIG. 2) to the position of transportation (FIG. 5), and vice versa, the hook 16 which forms the free end of the portion 13 follows the path 17 shown in dot and dash lines in FIGS. 2, 5, 12 to 15 and 17 to 19 while each articulation between a jack 11 and the telescopic arm 14 follows the path 18 depicted in the same way in the drawings.

In order to pass from the position in FIG. 2 to the position in FIG. 5, it is necessary first of all to manoeuver the jacks 11 in the direction of the inward return of the stem; firstly, the rocker 15 and arm 14 on the bracket remain in abutment against each other as shown in FIG. 2, the whole of the structure 10 tilting about the articulation between the rocker 15 and the frame 9. When the rocker 15 comes into abutment on the frame 9, the bracket 13, 14 tilts about its articulation on the rocker 15 until the telescopic arm 14 in its turn comes into abutment against the frame 9. The jack 19 is then actuated (FIG. 16) controlling the length of the arm 14, tending to cause the stem to emerge (elongation of the arm 14) and, once at the end of its travel, the apparatus 7 is in the position of transportation.

When the apparatus 7 is used for picking up from the ground a load such as the skip 1, with the hook 16 engaged in the handle 2, the two rails with which the bottom face of the skip 1 is provided each cooperate with the corresponding roller 12.

The length of the end portion 13 corresponds approximately to the height h so that the load remains in abutment on the frame 9 when the front face of the load is against the end portion 13 (the load slides on the frame 9 when the arm 14 is telescoped).

The skip 8 is of the type currently found in the United States. It is designed to be manipulated with an apparatus having a plate articulated at the rear of the truck chassis and whose front can be lifted in order to give the plate a certain inclination when picking up or placing on the ground a load, the plate of course being horizontal along the chassis in order to transport the load. The apparatus also has a cable and means of driving the later in order to haul the load onto the plate put in the inclined position (picking up from the ground) or for controlling the speed of lowering of the load towards the ground (placing on the ground).

The hook 20 situated at the front, at the bottom and at the center of the Skip 8, at the bottom of a niche 21 splayed towards the top and on each side, is normally provided for the cable of the apparatus with inclinable plate while the two wheels 22 situated respectively to the right and to the left (see in particular FIG. 4) are normally designed to slide or roll on the top face of the inclinable plate and on its rear face at the moment when the front of the skip rises in front of this rear face in order to reach the top face of the plate.

Figure 3:
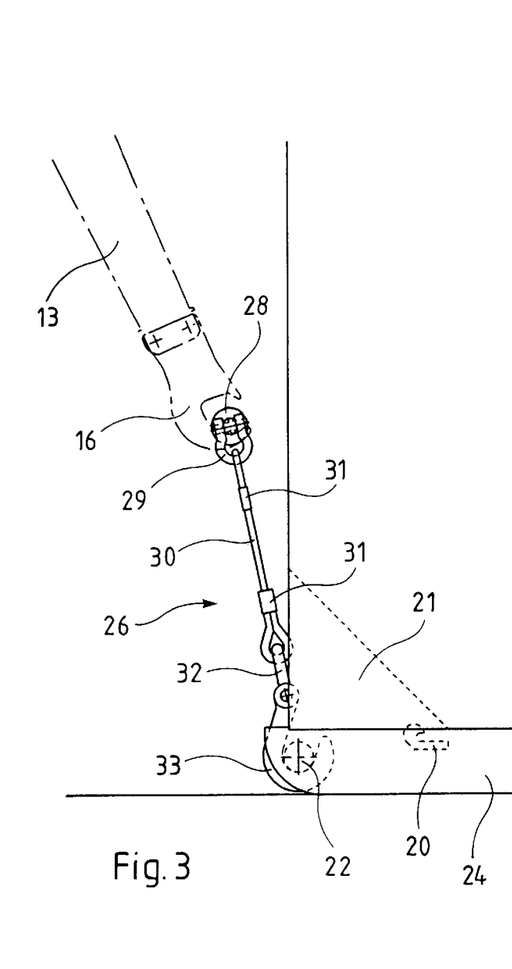
FIG. 3 shows a view in elevation, taken from the lefthand side, showing in more detail the sling illustrated in FIG. 2 and the elements of the handling apparatus and of the skip between which the sling is fitted.
Figure 4:
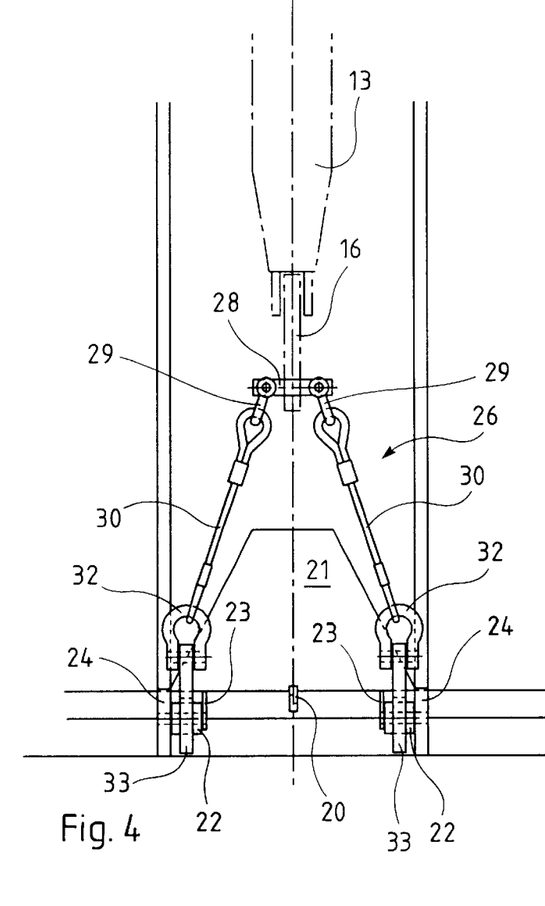
FIG. 4 shows a view in elevation, taken from the front, showing in more detail the sling illustrated in FIG. 2 and the elements of the handling apparatus and of the skip between which the sling is fitted.

As can be seen more particularly in FIGS. 3 and 4, the separation between the wheels 22 corresponds to the width of the niche 21, the wheels 22 are each carried on the inside by a respective fork 23 while they are each carried on the outside by a respective profiled member 24 extending over the entire length of the skip 8. At the rear of the later, on each side, there is normally provided a roller 25 for facilitating cooperation with the ground during maneuvers of picking up or placing on the ground.

In accordance with the present invention, a sling 26 is provided for serving as connecting means between the hook 16 and the wheels 22 while a winching assembly including a cable 27 (an assembly not depicted in particular in FIGS. 3, 4, 5 and 7) is designed so that the end of the cable 27 engages on the hook 20 in order to control, during maneuvers of picking up or placing on the ground, the distance between the wheels 22 and the end of the end portion 13 opposite to the hook 16, that is to say the end by means of which the portion 13 is attached to the telescopic arm 14.

During the maneuvers of handling the load 8, the sling 26 is designed to pivot both about the hook 16 and about the wheels 22, and its length is such that the sling can be put in place or removed in the position of picking up or placing on the ground (FIG. 2).

As shown in FIGS. 4, 5, 6 and 7, the sling 26 has a circular bar 28 adapted to engage in the hollow of the hook 16 and, on each side of the bar 28: a shackle 29 whose rod is engaged in a transverse end hole in the bar 28, a cable 30, each end of which forms a loop by virtue of a hoop 31 with the stirrup of the shackle 29 which passes through one of the loops in the cable 30, the shackle 32 whose stirrup passes through the other loop in the cable 30, and a hook 33 through a transverse end hole of which the rod of the shackle 32 passes and whose hollow is adapted to receive a wheel 22.

The rounded shape of the bar 28 enables it to pivot in the hook 16 during handling maneuvers, the presence of a shackle on each side make it possible to prevent the bar 28 from laterally disengaging from the hook 16.

The pivoting of the sling 26 with respect to the skip 8 takes place by sliding of the hooks 33 on the external surface of the wheels 22 and/or by rotation of the latter about their journal.

In a variant which is not shown, the bar 28 is replaced with an O-ring directly engaged in the loop in the cables 30.

A description will now be given, with the help of FIGS. 8 to 11, of the winching assembly with which the apparatus 7 is provided, and more particularly the end portion 13.

This assembly includes, in addition to the cable 27, a winching jack 35 mounted on the end portion 13 parallel to it in the opposite direction to the arm 14, an aperture 36 being provided in the portion 13 at its end by means of which it is connected to the arm 14 to enable the cable 27 to pass on the side where this arm is situated, and more generally on the side where the remainder of the structure 10 is situated.

By virtue of this arrangement, the jack 35 introduces no interference in the position of picking up or placing on the ground (FIG. 2) or in the position of 2 5 transportation (FIG. 5) in which the front of the load 8 can come up against the end portion 13.

Figures 8, 9, 11:
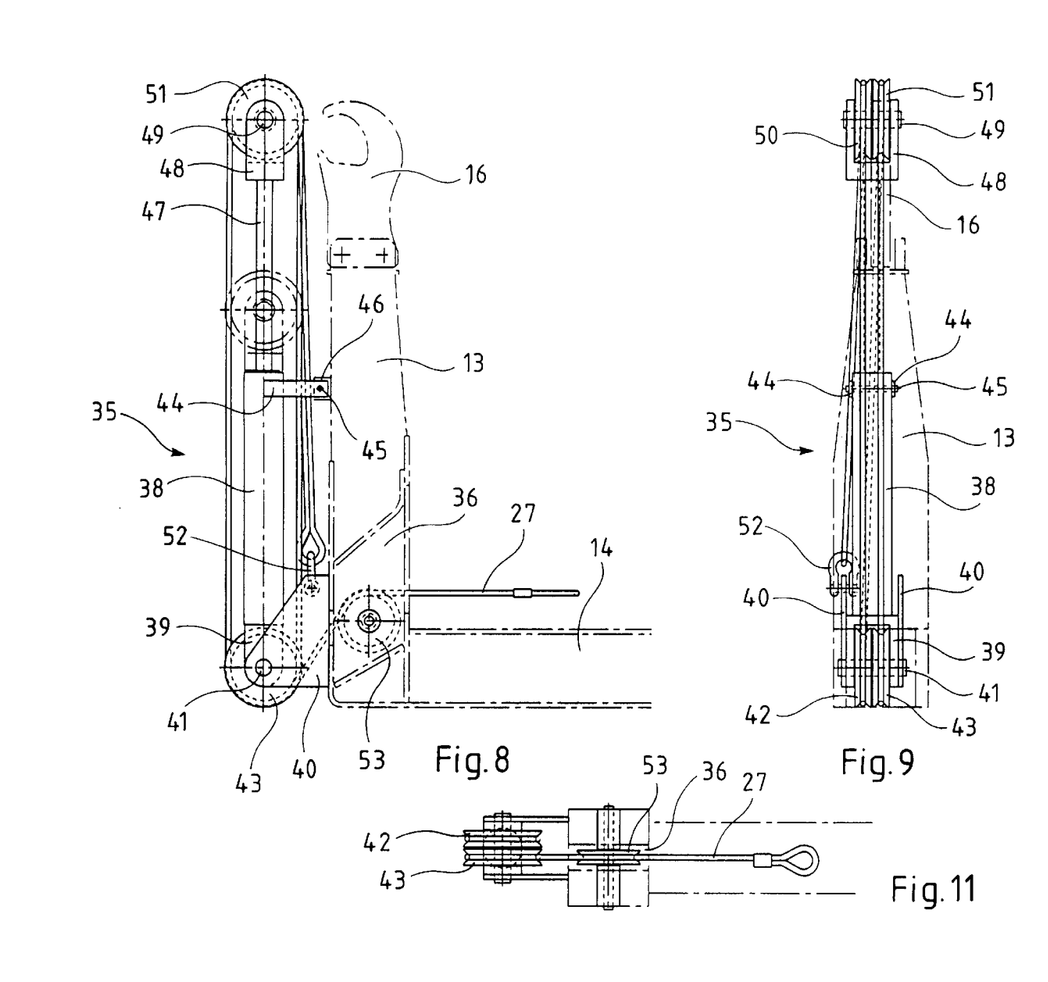
FIG. 8 shows a view in elevation taken from the left-hand side and showing more particularly the winching assembly with which the end portion of the handling structure of the apparatus is provided.
FIG. 9 shows a view in elevation taken from the front, corresponding to FIG. 8, the hook forming the free end of the end portion not being depicted.
FIG. 11 shows a plan view in section showing how the cable of the winching assembly cooperates with the fixed pulleys of the winching jack and with the pulley on the end portion.
Figure 10:
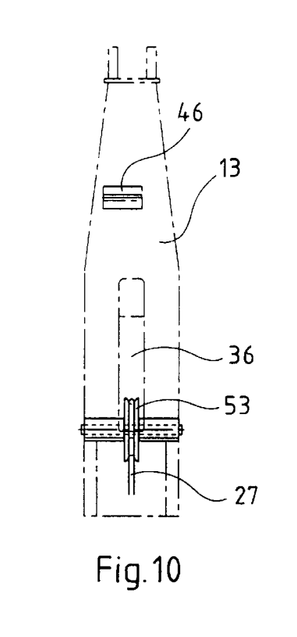
FIG. 10 shows a view similar to FIG. 9 but in which the winching jack is not depicted, showing more particularly the aperture and the pulley provided at the end of the end portion by means of which the latter is attached to the remainder of the handling structure.

The body 38 of the jack 35 is fixed at its closed end to a fork 39 engaged between two bearers 40 on the end portion 13 with respect to which the fork 39 (and therefore the body 38) is articulated by virtue of a journal 41 which also carries two identical pulleys 42 and 43 rotatably mounted in the fork 39.

Close to the end of the body 38 by means of which the stem 47 of the jack 35 emerges, a lug 44 is fixed on each side, fixed by virtue of a bolt 45 to a small tube end 46 with a square cross-section attached to the end portion 13.

The free end of the stem 47 carries a fork 38 on which two pulleys 50 and 51 are rotatably mounted, by virtue of the journal 49.

The rod of a shackle 52 is engaged in the bearer 40 which can be seen on the left in FIG. 9 while the stirrup of the shackle 52 receives the loop of one of the ends of the cable 27. From the shackle 52, the cable 27 joins the pulley 50, passing between the lugs 44, it goes around this pulley and rejoins the pulley 42, around which it goes, and then it joins the pulley 51 passing once again between the lugs 44, it goes around this pulley 51 and then around the pulley 43 before passing through the aperture 36, bearing on the return pulley 53.

When the stem 47 of the jack 35 is out, as shown in FIG. 9 and in solid lines in FIG. 8, almost all the cable 27 is on the jack 35 whereas, when the stem 4 is in, as shown in dot and dash lines in FIG. 8, a long length of cable 27 is available.

The winding of the cable 27 around the fixed pulleys 42 and 43 and the movable pulleys 50 and 51 makes it possible, with a certain degree of movement of the stem 47, to drive the cable 27 over a length which is a multiple of this movement.

It will be observed that the wall delimiting the aperture 36 on the side of the hook 16 is inclined so as to enable the cable to position itself correctly in the position of picking up or placing on the ground shown in FIG. 2.

The return pulley 53 is useful in so far as the fixed pulleys 42 and 43 are not at the same level as the aperture 36.

The length of the jack 35 in the position with the stem out corresponds approximately to the length of the end portion 13, on the side where the jack 35 is situated.

A description will now be given how a manoeuver of picking up the skip 8 from the ground is effected with the device according to the present invention.

After having lifted the sling 26 between the hook 16 and the wheels 22 and having brought the winching jack into the position with stem in and having engaged the loop provided at the free end of the cable 27 in the hook 20, as shown in FIG. 2, the tilting jacks 11 are actuated in the direction of the entry of the stem while the jack 35 is acted on hydraulically so that its stem 47 can emerge in order to take up the slack in the cable 27 and cannot effect the reverse movement even if the cable 27 comes to be strongly acted on.

Figures 12, 13:
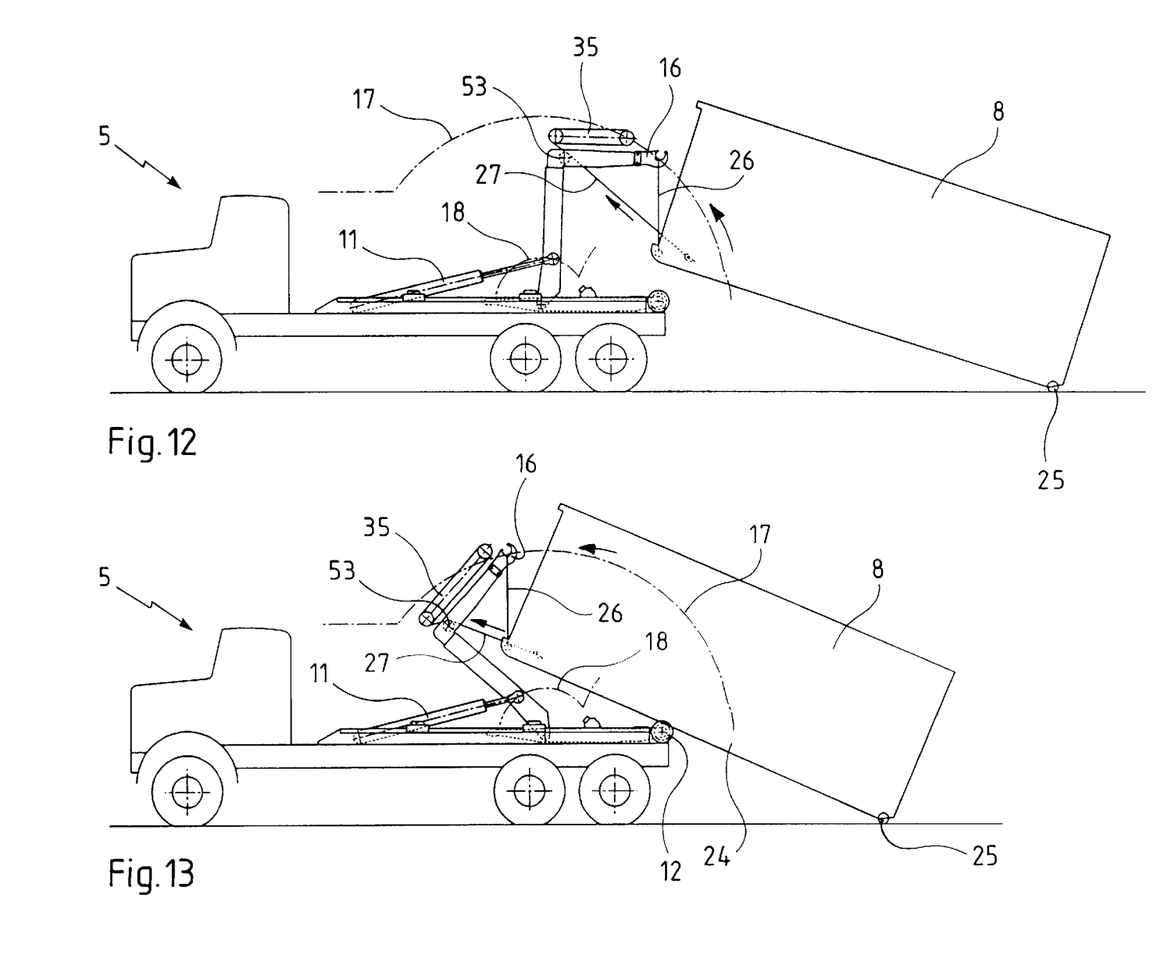
FIG. 12 shows a view similar to FIG. 2, for intermediate position between the position of picking up from the ground shown in FIG. 2 and the position of transportation shown in FIG. 5.
FIG. 13 shows a view similar to FIG. 3, for intermediate position between the position of picking up from the ground shown in FIG. 2 and the position of transportation shown in FIG. 5.

Under the effect of the hook 16 and sling 26, the front of the skip 8 lifts and the skip progressively approaches the truck 5 with the sling 26 remaining vertical or approximately so (it can pivot freely around both the hook 16 and the wheels 22) and with the winching jack 35 progressively taking up the slack in the cable 27 as shown in FIG. 12.

Figure 14:
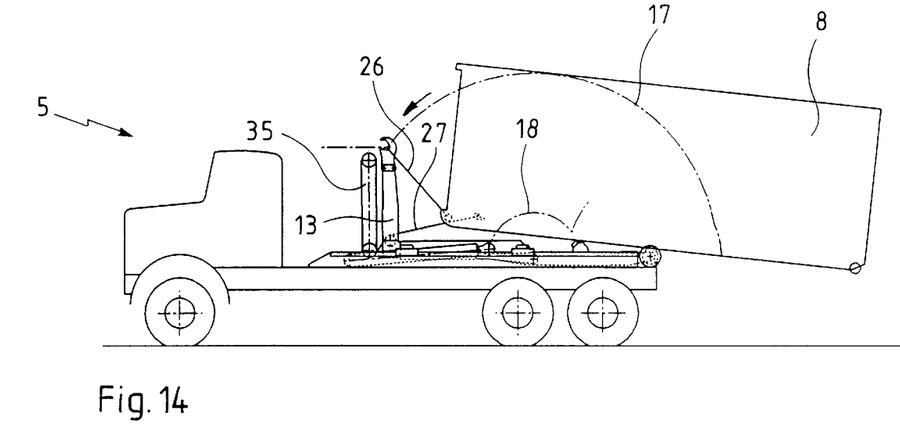
FIG. 14 shows a view similar to FIG. 4, for intermediate position between the position of picking up from the ground shown in FIG. 2 and the position of transportation shown in FIG. 5.

When the skip 8 comes up against the truck 5, more precisely when the profiled sections 24 come up against the rollers 12, as shown in FIG. 13, a traction force begins to be exerted on the cable 27 but, as the stem 47 cannot return into the body 38, the portion of the cable outside the jack 37 remains at the value which it has in the position in FIG. 13 so that, when the jack stems 11 are completely in or almost so, as shown in FIG. 14, the skip 8 is practically horizontal on the truck.

Figure 15:
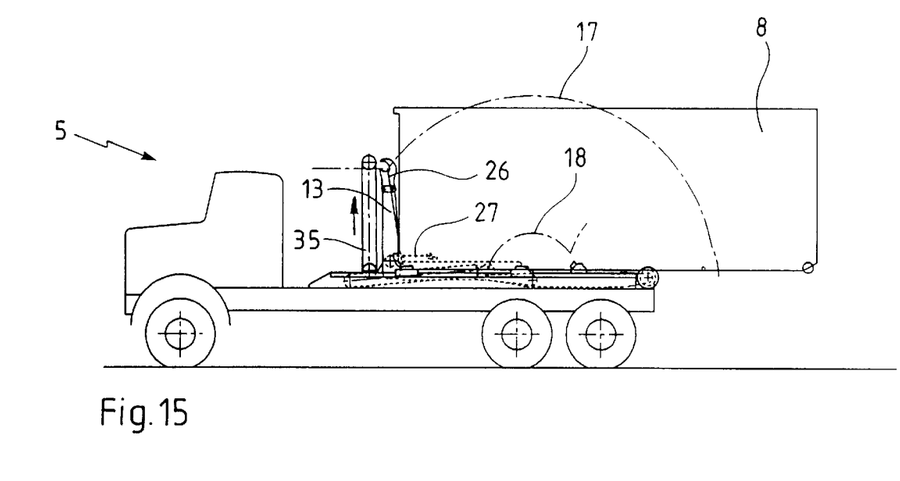
FIG. 15 shows a view similar to FIG. 5, for intermediate position between the position of picking up from the ground shown in FIG. 2 and the position of transportation shown in FIG. 5.

The jack 35 is then actuated in the direction of emerging of the stem, so that the wheels 22 move closer to the end portion 13 until they are against it, as shown in FIG. 15.

The jack 19 is then acted on in order to telescope the arm 14, which makes it possible to reach the position of transportation shown in FIG. 5.

It is of course possible to cause the stem of the jack 35 to emerge in another position but it is in the position in FIG. 14 that this operation is the most favorable from an energy point of view since the skip 8 is then practically horizontal.

A description will now be given, with the help of FIG. 16, of the hydraulic circuit of the handling apparatus 7.

The pump 55 driven by the motor of the vehicle 5 discharges into a line 56 which supplies, in series, the pilot-controlled double-acting control valves 57, 58 and 59, these control valves respectively controlling the winching jack 35, the tilting jacks 11 and the jack 19 for telescoping the arm 14.

Upstream of the control valves 57 to 59, a pressure limiter 61 connected to the reservoir 60 is provided for safety reasons.

The control valve 57 is connected by a line 62 to the large-section chamber of the jack 35 and by a line 63 to its small-section chamber. A counterbalance valve 64 is disposed on the line 62 and connected to the line 63 in order to ensure that, when there is a return movement of the stem of the jack 35, the outgoing flow rate of the large-section chamber is exactly proportional to the flow rate returning to the small-section chamber, in the ration of the cross-sections of these two chambers.

The control valve 58 is connected to the large-section chamber of each of the jacks 11 by a line 65 and to the small-section chamber of the jacks 11 by a line 66, a load regulation valve being provided on each of the lines 65 and 66 and connected to the other line.

A line 67 connects the line 66 to the line 62, a non-return valve 68 being provided to allow a circulation of fluid in the line 57 only in the direction from the line 66 to the line 62, a pressure reducing valve 69 also being provided in the line 67.

The control valve 59 is connected to the small-section chamber of the jack 19 by a line 70 and to the large-section chamber of this jack by a line 71, on which there is provided a pilot operated valve 72 in order to lock the jack 19 in the position with stem out (position of transportation).

Figure 16:
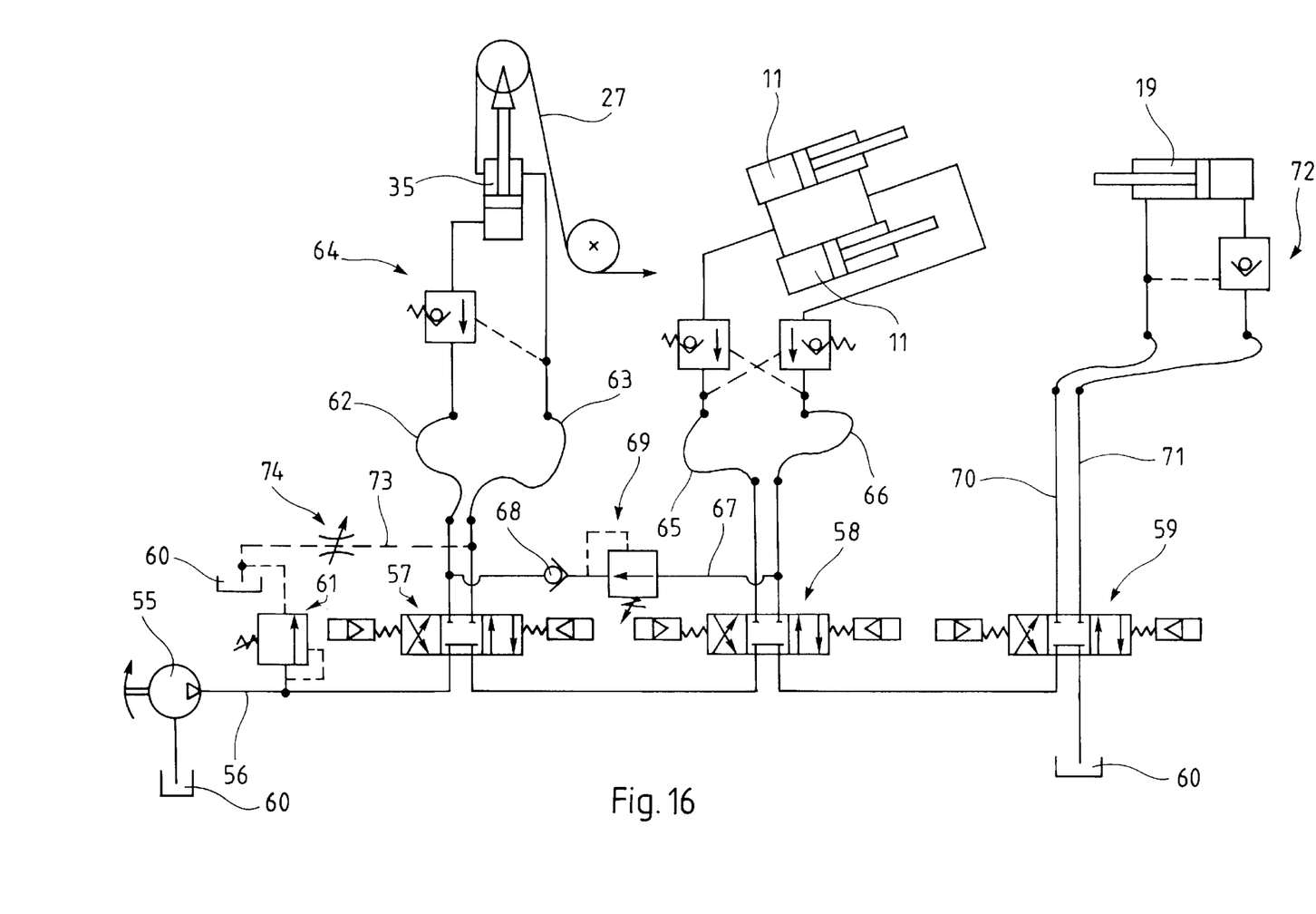
FIG. 16 shows a diagram of the hydraulic circuit of the handling apparatus.

In order to cause the apparatus 7 to pass from the position of picking up from the ground (FIG. 2) to the position of transportation (FIG. 5), the control valve 58 is actuated in order to make active the position drawn on the left in FIG. 16, corresponding to the inward stroke of the stem of the jacks 11. Because of the connection made by the line 67 between the lines 66 and 62, the large-section chamber of the jack 35 is brought to a pressure whose value is determined by the valve 69, this pressure enabling the stem of the jack 35 to come out in order to take up the slack in the cable 27, the volume of fluid which is then driven from the small-section chamber of the jack 35 rejoining the reservoir 60 by means of the line 73 situated between the line 63 and the reservoir 60, a restriction 74 being disposed on the line 73 in order to enable the line 63 to remain under pressure when the jack 35 is controlled in the direction of the return of the rod. The non-return valve 68 prevents the rod of the jack 35 being able to return while the jacks 11 are controlled in the direction of the return of the rod.

Once in the position of FIG. 14 (with the stem of the jacks 11 in or almost in), the control valve 58 is returned to its idle position and the control valve 57 is actuated in order to make active the position drawn on the right in FIG. 16, in order to control the jack 35 in the direction of the outward stroke of the rod.

When the position in FIG. 15 is reached (with the rod of the jack 35 out), the control valve 57 is returned to the idle position and the control valve 59 is actuated so as to cause it to pass into the position drawn on the left in FIG. 16, that is to say in the position which causes the stem of the jack 19 to emerge, which makes it possible to reach the position of transportation shown in FIG. 5.

Figure 17:
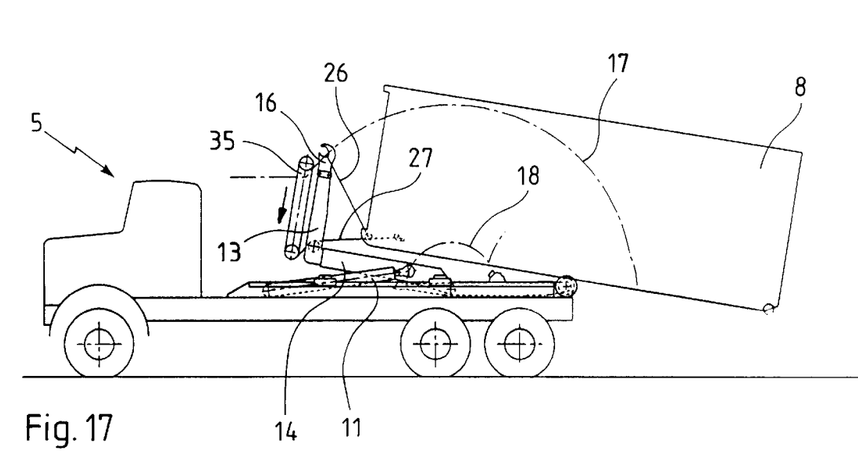
FIG. 17 is of the same nature as FIGS. 2, 5 and 12 to 15, for intermediate position between the position of transportation (FIG. 5) and the position of placing on the ground (FIG. 2).
Figure 18:
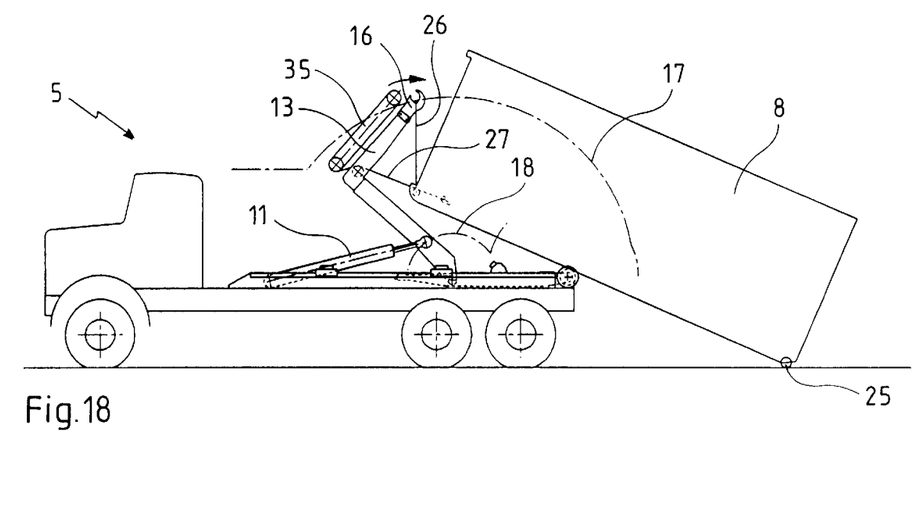
FIG. 18 is of the same nature as FIGS. 2, 5 and 12 to 15, for another intermediate position between the position of transportation (FIG. 5) and the position of placing on the ground (FIG. 2).

It will now be explained, in particular with the help of FIGS. 17 to 19, how a manoeuver of placing on the ground a load such as the skip 8 is effected.

The jack 19 is first of all actuated in the direction of return of the stem, until it reaches a position similar to that in FIG. 15, and then the tilting jacks 11 are actuated in the direction of the outward stroke of the stem until the skip 8 is inclined at an angle, here relatively small, with respect to the horizontal. The jacks 11 are then stopped being actuated and the winching jack 35 is controlled in the direction of the return of the stem, the length of the cable 27 thus released enabling the skip 8 to move away from the end portion 13 under the effect of gravity, the return of the stem of the jack 35 being continued approximately as far as the position shown in FIG. 17.

Figure 19:
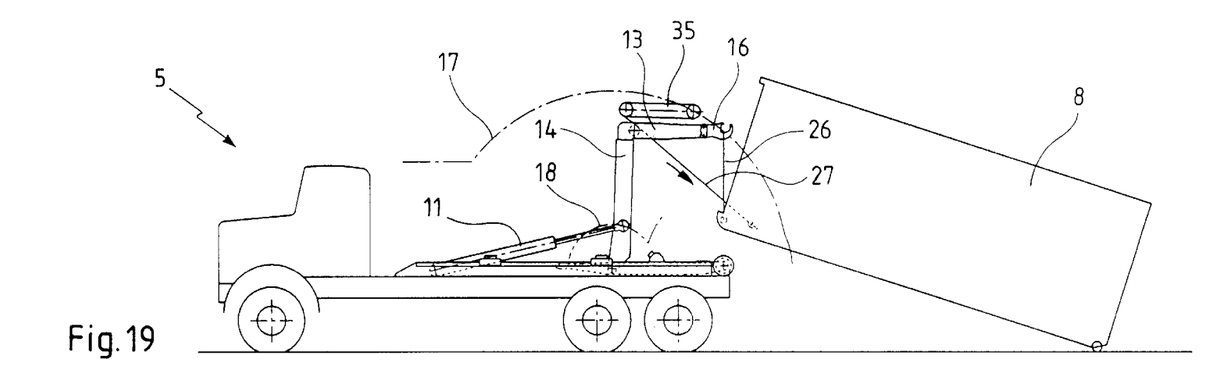
FIG. 19 is of the same nature as FIGS. 2, 5 and 12 to 15, for a further intermediate position between the position of transportation (FIG. 5) and the position of placing on the ground (FIG. 2).

The outward stroke of the stem of the jacks 11 is then controlled once again and when the inclination of the skip 8 becomes too great, the outward stroke of the stem of the jacks 11 is stopped and the return of the stem of the jack 35 is controlled, for example, releasing the entire available length of the cable 27 in the 2 5 position of FIG. 19 where the end portion 13 is horizontal, and this is continued until the position of placing on the ground shown in FIG. 2 is reached.

All that remains is to remove the sling 26 and unhook the cable 27 from the hook 20 so as to release the skip 8 from the truck 5.

The return of the rod of the jack 19 is effected by controlling the control valve 59 in order to bring it into the position drawn on the right in FIG. 16, the outward stroke of the stem of the jacks 11 being effected by bringing the control valve 58 into the position drawn on the right in FIG. 16, and the return of the stem of the jack 35 takes place by bringing the control valve 57 into the position drawn on the left in FIG. 16, the control valve 57 enabling the flow of fluid to be controlled, and therefore the speed of paying out of the cable 27, the valve 64 preventing any risk of cavitation under the effect of the high load applied to the jack 35.

Figure 20:
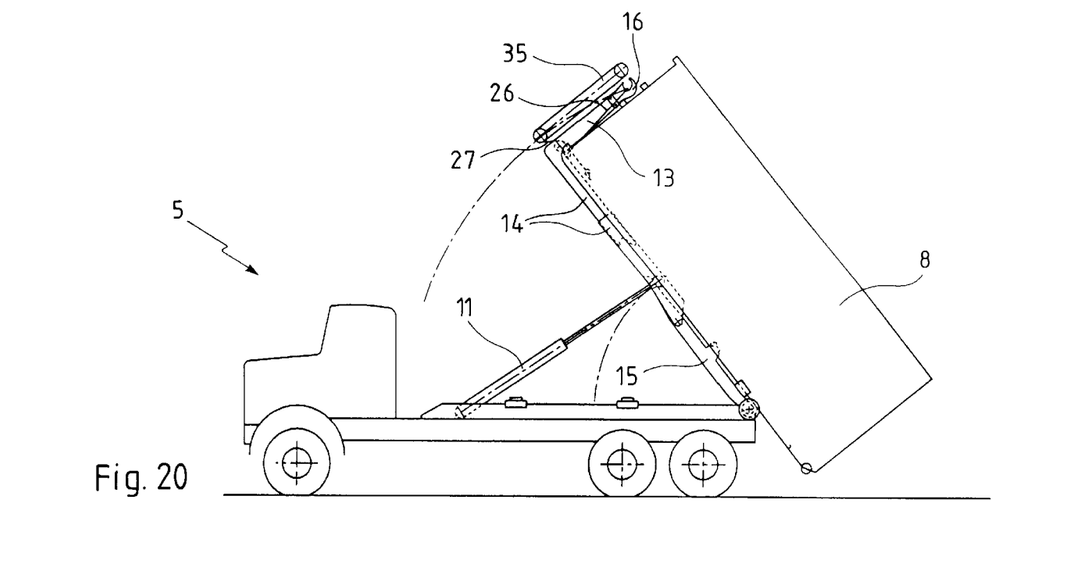
FIG. 20 shows, in a similar manner, the vehicle in the skip-unloading position.

In order to bring the apparatus 7 into the position of skipping illustrated in FIG. 20, the arm 14 and rocker 15 are locked with respect to each other in the configuration which they adopt in the position of transportation, and the jacks 11 are controlled in the direction of the outward stroke of the stem, so that the entire structure 10 tilts with the skip 8 about the articulation between the rear of the link 1 5 1 0 and the frame 9.

Means, not illustrated, are provided for neutralizing the jack 35 when a load such as the skip 1 is manipulated.

In a variant, not illustrated, of the hydraulic circuit of the apparatus 7, the control valves 55 to 59 are replaced by control valves supplied in parallel instead of being supplied in series.

In another variant, not illustrated, means are provided for automatically synchronizing the outward stroke of the stem of the jacks 11 and the return of the rod of the winching jack 35 so that the release of the cable 27 takes place automatically by the appropriate quantity as the structure 10 tilts; and/or means are provided for automatically controlling the outward stroke of the stem of the jack 35 when, during a manoeuver of picking up a load such as the skip 8 from the ground, the position of FIG. 14 is reached where the stem of the jacks 11 is almost completely returned, and means for ending the return of the stem of the jacks 11 once the rod of the jack 35 is completely out.

Figure 21:
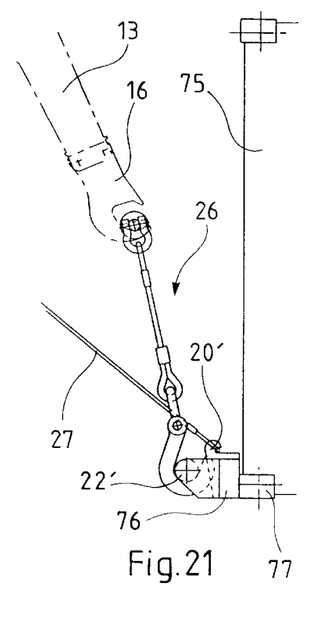
FIG. 21 shows a view similar to FIG. 3, where the load to 30be handled is an ISO standard container equipped with a suitable interface spreader.
Figure 22:
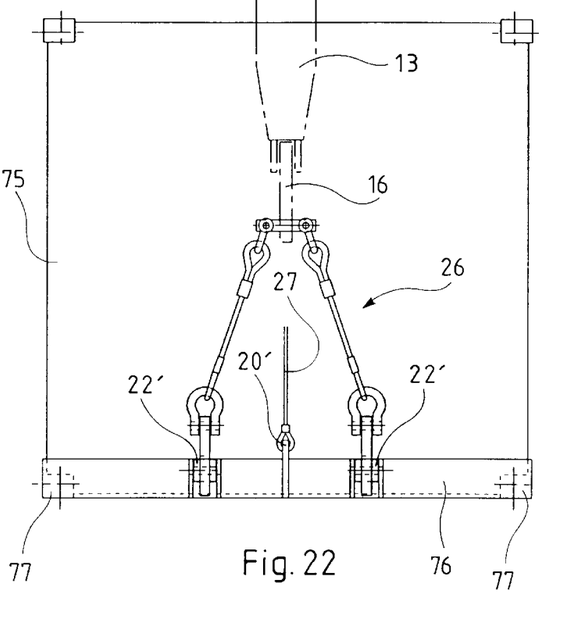
FIG. 22 shows a view similar to FIG. 4, where the load to 30be handled is an ISO standard container equipped with a suitable interface spreader.

As shown in FIGS. 21 and 22, it is possible to equip an ISO standard container 75 with an interface spreader 76 of the same width as the container 75 and provided at each end with a twist lock capable of locking from the front on the front lower corner lifting 77 of the container 75, the spreader 76 being provided with two wheels 22' and a hook 20' disposed geometrically in a similar manner to the wheels 22 and hook 30, except that the hook 20' is much less to the rear than the hook 20, so that the apparatus 7 cooperates with the hook 20' and with the wheels 22' in the same way as with the hook 20 and rollers 22.

It will be observed that the interface spreader 76 can also be used with a conventional apparatus for loading skips of the same type as the skip 8.

Figure 23:
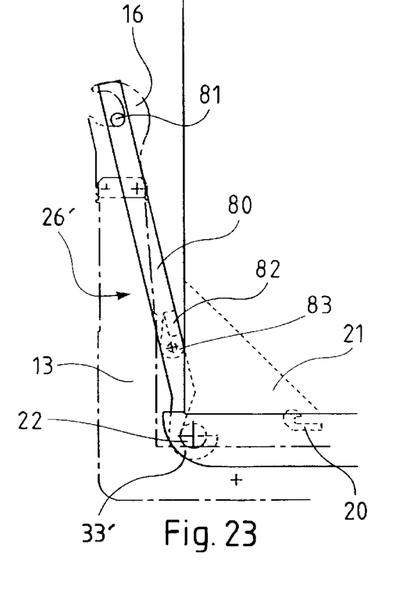
FIG. 23 shows a view similar to FIG. 3, in a variant where the sling is replaced with a rigid connecting means.
Figure 24:
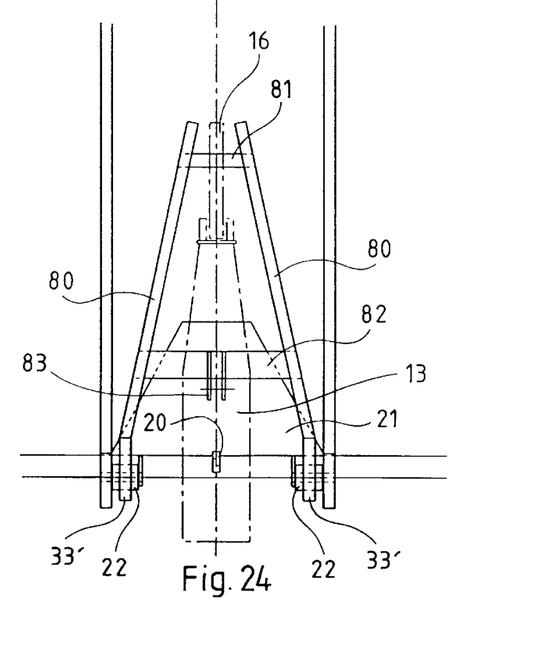
FIG. 24 shows a view similar to FIG. 4, in a variant where the sling is replaced with a rigid connecting means.

In the variant shown in FIGS. 23 and 24, the flexible connection means which constitutes the sling 26 is replaced with a rigid connecting means formed by a metallic frame 26' having a general A shape.

The frame 26' has more precisely two lateral legs 80, a circular bar 81 and a profiled section with a U-shaped cross-section 82, this bar and this profiled section being disposed between the legs 80.

The circular bar 81 is disposed transversely between the legs 80, which extend slightly beyond the bar 81 on the side where they are closest to each other. The bar 81 has a size enabling it to engage in the hollow in the hook 16 and is more generally capable of cooperating with the latter in the same way as the bar 28 on the sling 26, the holding of the bar 81 laterally with respect to the hook 16 being ensured directly by the legs 80.

The end of each of the legs 80 which is opposite to the bar 81 forms a hook 33' similar to the hook 33, the distance between the hooks 33' corresponding to the distance between the wheels 22.

The profiled section 82 is disposed transversely between the legs 80, at a location relatively close to the hooks 33', so that the profiled section 82 is opposite 2 0 the niche 21 when it is lifted on the skip 8.

In order to prevent any problem which would be caused by the fact that the profiled section 82 is on the path of the cable 27, a hook 83 for the free end of this cable is disposed at the center of the profiled section 82. It will be noted also that it is easier for the operator to attach the end of the cable 27 to the hook 83 than to the hook 20, which is at the bottom of the niche 21.

Figure 25:
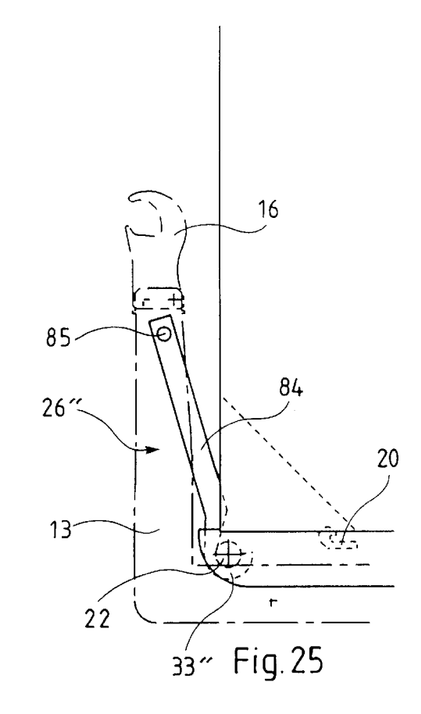
FIG. 25 shows a view similar to FIG. 23, in a variant where the connecting means is permanently mounted on the end portion.

In the variant shown in FIG. 25, the sling 26 is replaced by a pair 26" of legs 84 mounted so as to rotate about the journal 85 carried by the end portion 13 close to the hook 16, the two legs 84 each being able to pivot about the journal 85 independently of each other.

The end of each of the legs 84 which is opposite to the journal 85 forms a hook 33" similar to the hook 33.

A small fastener (not shown) makes it possible to hold the legs 84 in a position where they remain against a lateral face of the portion 13 when the apparatus 7 is used for a load such as the skip 1.

In a variant which is not shown, the means of connection between the free end of the end portion 13 and the wheels 22 of a load such as the skip 8, are formed by a frame such as the frame 26' but without the profiled section 82 (the hook 20 then being used) or with a profiled section similar to the profiled section 82 but not coming to be positioned opposite the niche 21, this profiled section being provided or not with a hook 83; and in another variant which is not shown, a profiled section such as the profiled section 82 is provided between legs articulated on the portion 13 like the legs 84.

Figures 26, 28:
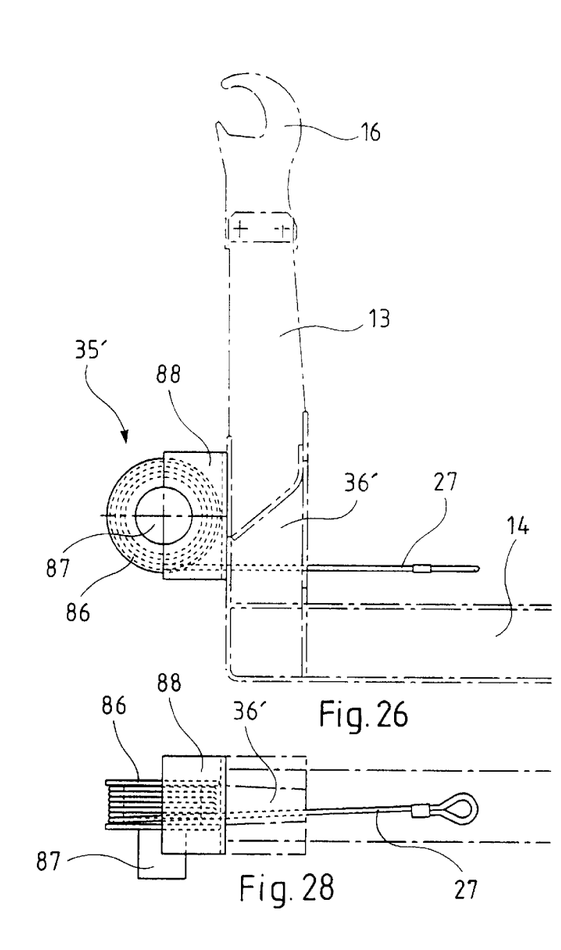
FIG. 26 shows a view in elevation taken from the left-hand in a variant where the winching assembly is of the type with a winder.
FIG. 28 shows a plan view taken from above, in a variant where the winching assembly is of the type with a winder.
Figure 27:
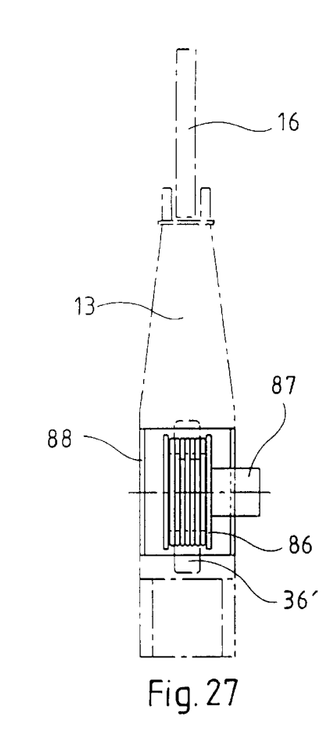
FIG. 27 shows a view in elevation taken from the front in a variant where the winching assembly is of the type with a winder.

In the variant shown in FIGS. 26 to 28, the winching jack 35 is replaced by a winching winder 35' having a reel 86 driven by a hydraulic motor 87, the winder 35' being mounted on a casing 88 attached to the end portion 13.

More precisely, the casing 88 makes it possible to dispose the reel 86 opposite to the telescopic arm 14 and at a height such that there is no need for a return pulley in the aperture 36' which enables the cable 27 to pass through the portion 13.

In a variant which is not shown, other winching means are used, notably electrically controlled, and/or the winching means are located on a frame of the same type as the frame 26' or a removable winching means is fixed to a load such as the skip 8 with the end of the cable attached at a suitable point on the structure 10 to control the distance between the means of gripping the load such as the wheels 22 and the end by means of which the end portion 13 is connected to the rest of the structure 10.

In other variants, not shown, the structure 10 is replaced by a similar structure, making it possible for example, to vary the angle between the end portion and the remainder of the handling structure; and/or other types of load having a gripping means at a height less than h are manipulated, for example, a simple plate provided with a means of gripping at one of its ends.

More generally, it should be stated that the present invention is not limited to the examples described and depicted.

What is claimed is:

1. A device for enabling a vehicle to pick up and place on the ground loads having at least one of first and second types of gripping arrangements at front sides thereof, the device comprising:

a handling structure including an end portion and a remaining part, the end portion extending between a free end and an attached end, the free end being selectively rotatable coupled to the first type gripping arrangement so that the first type gripping arrangement is suspended therefrom, wherein the first type gripping arrangement extends from the load at least a predetermined height above the ground and wherein the attached end is attached at an angle to the remaining part;

a mounting arrangement tiltably mounting the handling structure on a chassis of the vehicle;

a driving arrangement driving the handling structure between a transportation position and a lowered position for picking up and placing loads, wherein when in the transportation position, the remaining part is disposed along the chassis and the end portion extends away from the remaining part and forward of the remaining part with the free end above the attached end, and wherein, when in the lowered position, the end portion is rearward of the remaining part and behind the vehicle with the attached end being above the free end, the free end being at the predetermined height above the ground;

when the device is to be coupled to a load having the second type gripping arrangement which extends from the load at a height less than the predetermined height, the device further comprising:

a connecting arrangement having a first end and a second end, the first end being selectively rotatable coupled to the free end, the second end being selectively rotatable coupled to the second type gripping arrangement; and a controlling arrangement coupled to the attached end and selectively coupled to the second type gripping arrangement for controlling a distance between the attached end and the second type gripping arrangement.

2. A device according to claim 1, wherein the free end being a hook adapted to engage with the first type gripping arrangement.

3. A device according to claim 2, wherein the connecting arrangement has, at one end, hooks adapted to hook onto a pair of wheels which are situated at the bottom and in front of the load, the wheels serving as the second type gripping arrangement.

4. A device according to claim 1, wherein the free end is a hook, the connecting arrangement being adapted to be lifted on the hook.

5. A device according to claim 1, wherein the connecting arrangement is mounted so as to rotate on a journal, the journal being disposed at the free end.

6. A device according to claim 1, wherein the connecting arrangement includes hooks which are situated at the second end the second type gripping arrangement being a pair of wheels which are situated at a bottom of the load and in front of the load, the hooks being adapted to hook onto the wheels.

7. A device according to claim 6, wherein the connecting arrangement has an interface provided with twist locks which are adapted to engage on the front bottom corner fittings of an ISO-standard container.

8. A device according to claim 1, wherein the load is an ISO-standard container, the connecting arrangement including an interface, the interface having provided with twist locks which are adapted to engage on front bottom corner fittings of the ISO-standard container.

9. A device according to claim 8, wherein the controlling arrangement controls the distance between the attached end and the second type gripping arrangement, the controlling arrangement including:

a cable adapted to leave the handling structure at the attached end, and a winching arrangement mounted on the handling structure for one of extending and shortening, in a controlled manner, the quantity of the cable situated between the attached end and the free end.

10. A device according to claim 1, wherein the controlling arrangement includes:

a cable adapted to leave the handling structure at the attached end and a winching arrangement mounted on the handling structure, the winching arrangement extending or shortening, in a controlled manner, a quantity of the cable which is situated between the attached end and a particular free end of the cable.

11. A device according to claim 10, wherein the cable has, at the particular free end of the cable, a loop which is adapted to cooperate with a central hook of the load, the central hood being provided at a bottom of the load and at the front of the load.

12. A device according to claim 11, wherein the connecting arrangement has a hook, the cable being adapted to the hook to be attached.

13. A device according to claim 11, wherein the winching arrangement includes a winder having a reel.

14. A device according to claim 10, wherein the connecting arrangement includes a hook, the cable being adapted to be attached to the hook.

15. A method for enabling a vehicle to pick up and place on the ground loads having at least one of first and second types of gripping arrangements at front side of thereof, comprising the steps of:

(a) providing an apparatus including:

a handling structure including an end portion and a remaining part, the end portion extending between a free end and an attached end, the free end being selectively rotatably coupled to the first type gripping arrangement so that the first type gripping arrangement is suspended therefrom, wherein the first type gripping arrangement extends from the load at least a predetermined height above the ground and wherein the attached end is attached at an angle to the remaining part;

a mounting arrangement tiltably mounting the handling structure on a chassis of the vehicle;

a driving arrangement driving the handling structure between a transportation position and a lowered position for picking up and placing loads, wherein, when in the transportation position, the remaining part is disposed along the chassis and the end portion extends away from the remaining part forward of the remaining part with the free end above the attached end, and wherein, when in the lowered position, the end portion is rearward of the remaining part and behind the vehicle with the attached end being above the free end, the free end being at the predetermined height above the ground;

wherein the apparatus is capable of picking up and placing on the ground the load having the second type gripping arrangement, the second type gripping arrangement being situated at a height which is below the predetermined height;

(b) disposing a connecting arrangement of the apparatus between the free end of the end portion and the second type gripping arrangement so that the connecting arrangement can pivot both about the free end and the second type gripping arrangement; and (c) between the position of transportation and the lowered position, controlling a distance between the attached end and the second type gripping arrangement.

16. An apparatus suitable for forming a part of a device, the device enabling a vehicle to pick up and place on the ground loads having at least one of first and second types of gripping arrangements at front sides thereof, the apparatus comprising:

a handling structure including an end portion and a remaining part, the end portion extending between a free end and an attached end, the free end being selectively rotatably coupled to the first type gripping arrangement so that the first type gripping arrangement is suspended therefrom, wherein the first type gripping arrangement extends from the load at least a predetermined height above the ground and wherein the attached end is attached at an angle to the remaining part;

a mounting arrangement tiltably mounting the handling structure on a chassis of the vehicle;

a driving arrangement driving the handling structure between a transportation position and a lowered position for picking up and placing the loads, wherein, when in the transportation position, the remaining part is disposed along the chassis and the end portion extends away from the remaining part and forward of the remaining part with the free end above the attached end, and wherein, when in the lowered position, the end portion is rearward of the remaining part and behind the vehicle with the attached end being above the free end, the free end being at the predetermined height above the ground;

when the device is to be coupled to a load having the second type gripping arrangement which extends from the load at a height less than the predetermined height, the apparatus further comprising:

a cable adapted to leave the handling structure at the attached end of the end portion; and a winching arrangement being mounted on the handling structure, the winching arrangement extending or shortening, in a controlled manner, a quantity of the cable, the cable being situated between the attached end of the end portion and a particular free end of the cable.

17. An apparatus according to claim 16, wherein the winching arrangement is disposed on the end portion, and wherein, opposite to the remaining part, an aperture is formed in the end portion to enable the cable to pass.

18. An apparatus according to claim 16, further comprising:

a controlling arrangement controlling the winching arrangement, the controlling arrangement enabling the winching arrangement, during a manoeuver of picking up the load from the ground, to take up a slack in the cable in a direction of shortening the quantity of the cable, the cable being situated between the attached end of the end portion and the particular free end of the cable, the controlling arrangement preventing a reverse movement.

19. An apparatus according to claim 16, further comprising:

a controlling arrangement controlling the winching arrangement, the controlling arrangement enabling the winching arrangement, during a manoeuver of placing the load on the ground, to control a speed at which the cable is paid out.

20. An apparatus according to claim 16, wherein the winching arrangement includes a jack, each end of the jack includes at least one pulley.

21. An apparatus according to claim 16, wherein the winching arrangement includes a winder having a reel.

* * * * *